United States Patent
Fang et al.

(10) Patent No.: US 12,507,825 B2
(45) Date of Patent: Dec. 30, 2025

(54) NONSTICK COOKING UTENSIL WITH PURE INORGANIC STRUCTURAL LAYER AND MANUFACTURING METHOD THEREOF

(71) Applicant: ZHEJIANG SANHE KITCHENWARE CO., LTD., Cixi (CN)

(72) Inventors: Cheng Fang, Cixi (CN); Qiang Cheng, Cixi (CN)

(73) Assignee: ZHEJIANG SANHE KITCHENWARE CO., LTD., Cixi (CN)

( * ) Notice: Subject to any disclaimer, the term of this patent is extended or adjusted under 35 U.S.C. 154(b) by 15 days.

(21) Appl. No.: 18/635,032

(22) Filed: Apr. 15, 2024

(65) Prior Publication Data
US 2024/0251986 A1    Aug. 1, 2024

Related U.S. Application Data

(63) Continuation of application No. PCT/CN2023/099824, filed on Jun. 13, 2023.

(30) Foreign Application Priority Data

Nov. 9, 2022    (CN) .................. 202211398575.4
Nov. 9, 2022    (CN) .................. 202222978121.6

(51) Int. Cl.
A47J 36/02       (2006.01)
C09D 5/16        (2006.01)

(52) U.S. Cl.
CPC .......... *A47J 36/025* (2013.01); *C09D 5/1693* (2013.01)

(58) Field of Classification Search
CPC ........ A47J 36/025; C09D 5/1693; C23C 4/00; Y10S 220/912
(Continued)

(56) References Cited

U.S. PATENT DOCUMENTS 8,851,319 B2 * 10/2014 Berrux .................. A47J 36/025
                                                                  220/573.1
11,464,358 B1 * 10/2022 Mitrik ..................... A47J 36/06
(Continued)

FOREIGN PATENT DOCUMENTS

CN    102641078 A    8/2012
CN    205923776 U    2/2017
(Continued)

*Primary Examiner* — Rafael A Ortiz
(74) *Attorney, Agent, or Firm* — Bayramoglu Law Offices

(57) ABSTRACT

A nonstick cooking utensil with a pure inorganic structural layer and a manufacturing method thereof are provided. The cooking utensil includes a base layer and a pure inorganic structural layer, where the pure inorganic structural layer is formed by spraying inorganic particles on an inner surface of the base layer; the inorganic particles in the pure inorganic structural layer form a connected pore structure; the pure inorganic structural layer includes at least three inorganic structural sub-layers; the at least three inorganic structural sub-layers are sequentially stacked on the inner surface of the base layer according to sizes of the inorganic particles; the inorganic particles in the inorganic structural sub-layer adjacent to the base layer have a largest size; and in a direction away from the base layer, the sizes of the inorganic particles in the multiple inorganic structural sub-layers decrease sequentially.

12 Claims, 1 Drawing Sheet

(58) Field of Classification Search
USPC .................................... 220/573.2; 427/427
See application file for complete search history.

(56) References Cited

U.S. PATENT DOCUMENTS

| | | | | |
|---|---|---|---|---|
| 2010/0181322 A1* | 7/2010 | Perillon | ................ | A47J 36/025 |
| | | | | 220/573.2 |
| 2011/0311701 A1* | 12/2011 | Lewis | .................... | A47J 36/04 |
| | | | | 220/573.1 |
| 2012/0132655 A1* | 5/2012 | Perillon | ................ | B05D 5/086 |
| | | | | 220/573.1 |
| 2014/0305948 A1* | 10/2014 | Gantillon | .............. | A47J 36/025 |
| | | | | 220/573.2 |

FOREIGN PATENT DOCUMENTS

| | | | |
|---|---|---|---|
| CN | 110123146 | A | 8/2019 |
| CN | 110754915 | A | 2/2020 |
| CN | 110757915 | A | 2/2020 |
| CN | 112137425 | A | 12/2020 |
| CN | 113999555 | A | 2/2022 |
| CN | 114052505 | * | 2/2022 |
| CN | 114196320 | A | 3/2022 |
| CN | 115137215 | A | 10/2022 |
| CN | 115474829 | A | 12/2022 |
| FR | 2625494 | A1 | 7/1989 |

\* cited by examiner

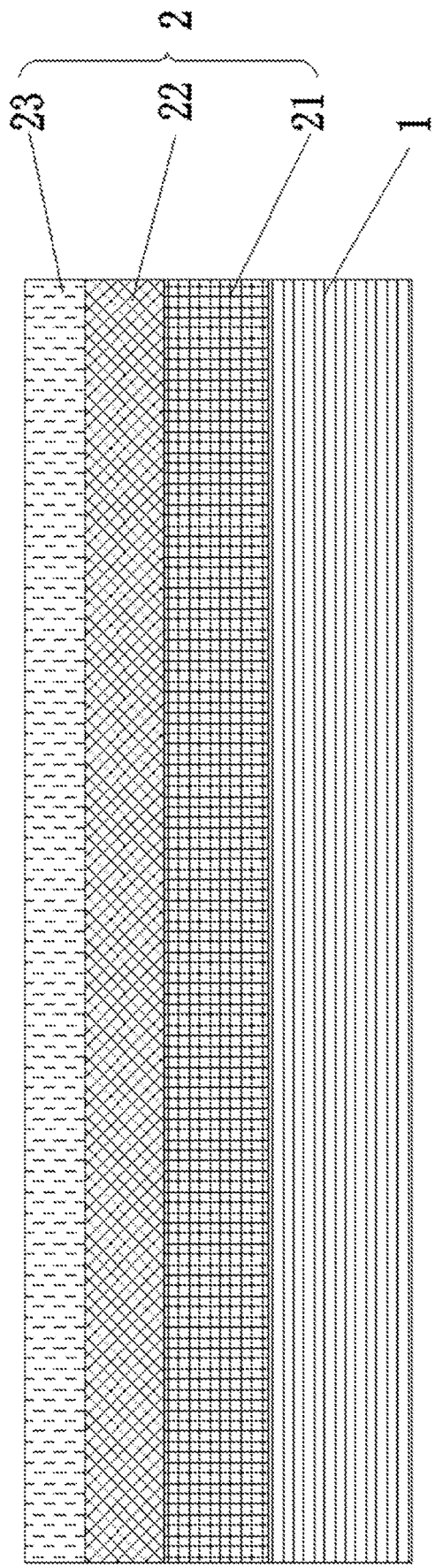

ent application No. 202211398575.4, filed on Nov. 9, 2022; and Chinese Patent Application No. 202222978121.6, filed on Nov. 9, 2022, the entire contents of which are incorporated herein by reference.
NONSTICK COOKING UTENSIL WITH PURE INORGANIC STRUCTURAL LAYER AND MANUFACTURING METHOD THEREOF

CROSS-REFERENCE TO THE RELATED APPLICATIONS

This application is a continuation application of International Application No. PCT/CN2023/099824, filed on Jun. 13, 2023, which is based upon and claims priority to Chinese Patent Application No. 202211398575.4, filed on Nov. 9, 2022; and Chinese Patent Application No. 202222978121.6, filed on Nov. 9, 2022, the entire contents of which are incorporated herein by reference.

TECHNICAL FIELD

The present disclosure relates to the technical field of kitchen utensils, and in particular to a nonstick cooking utensil with a pure inorganic structural layer and a manufacturing method thereof.

BACKGROUND

Nonstick cooking utensils, especially nonstick pans, which have a nonstick function mainly achieved through a nonstick layer on the base surface, are currently the mainstream cookware products in the market.

In the prior art, a commonly used nonstick material mainly includes an organofluorine compound such as polytetrafluoroethylene, which achieves the nonstick function of the cooking utensil through its non-wetting property. However, the organofluorine compound will decompose at high temperature (such as when the polytetrafluoroethylene is at a temperature above 250° C.). This will result in damage to the organofluorine compound coating and loss of the nonstick function of the cooking utensil. Meanwhile, when the organofluorine compound coating decomposes, it will produce a toxic substance that is harmful to human health.

Another nonstick material mainly includes silica sol resin. Like the organofluorine compound, silica sol resin exhibits excellent nonstick properties. However, due to its own characteristics, silica sol resin has significant limitations in terms of temperature resistance, hardness, durability, and environmental safety, making it unable to fully meet market and consumer requirements.

Furthermore, there is another option to use ceramics and enamels as nonstick materials for cooking utensils. Ceramics and enamels feature attractive appearance, high temperature resistance, high hardness, high durability, and environmental friendliness, but they do not have nonstick properties themselves, resulting in weak nonstick performance in both oil and oil-free conditions. Therefore, ceramics and enamels are generally used in products such as soup pots and stew pots, and cannot be widely promoted.

At present, there is a nonstick structure that forms numerous small grooves or capillary pores on the inner surface of the cooking utensil, which reduce the contact area between the food and the inner surface of the cooking utensil and allow for the adsorption of oil. When the cooking utensil is heated, the oil in the grooves and capillary pores expands and releases from the grooves and capillary pores, forming a layer of oil film on the bottom of the cooking utensil to achieve a nonstick effect. When the heating is stopped, the edible oil cools down and is stored in the grooves and capillary pores on the inner surface of the cooking utensil. The cooking utensil with the above nonstick structure can maintain a long-term nonstick effect. However, the small grooves or capillary pores significantly affect the nonstick performance of the cooking utensil and require a specific structure to achieve a desired nonstick effect, making high requirements for the manufacturing process.

SUMMARY

In order to solve the above-mentioned technical problem, the present disclosure proposes a nonstick cooking utensil with a pure inorganic structural layer and a manufacturing method thereof.

An aspect of the present disclosure provides a nonstick cooking utensil with a pure inorganic structural layer. The cooking utensil includes a base layer and a pure inorganic structural layer, where the pure inorganic structural layer is formed by spraying inorganic particles on an inner surface of the base layer; the inorganic particles in the pure inorganic structural layer form a connected pore structure; and the inorganic particles sprayed on the inner surface of the base layer are pure inorganic particles, excluding organic solvents; and the pure inorganic structural layer includes at least three inorganic structural sub-layers; the at least three inorganic structural sub-layers are sequentially stacked on the inner surface of the base layer according to sizes of the inorganic particles; the inorganic particles in the inorganic structural sub-layer adjacent to the base layer have a largest size; and in a direction away from the base layer, the sizes of the inorganic particles in the multiple inorganic structural sub-layers decrease sequentially, and pores in the multiple inorganic structural sub-layers decrease sequentially in the direction away from the base layer.

In an embodiment, the inorganic particles have a size of 100 nm to 60 μm, and are coated onto the inner surface of the base layer by plasma spraying, supersonic spraying, cold spraying, laser cladding, or air spraying; and the pure inorganic structural layer has a thickness of 61-130 μm.

In an embodiment, the inorganic particles are metal particles or ceramic particles or carbon powder; the metal particles are one or more of titanium, titanium alloy, zirconium, zirconium alloy, stainless steel, low-carbon steel, high-carbon steel, and zinc; the ceramic particles are one or more of zirconium oxide, zirconium nitride, titanium oxide, titanium nitride, titanium carbide, aluminum oxide, magnesium oxide, triiron tetroxide, ferric oxide, boron nitride, calcium oxide, silicon oxide, and silicon nitride; and the carbon powder is one or more of natural graphite, polycrystalline graphite, pyrolytic graphite, highly oriented pyrolytic graphite, and carbon quantum dot.

In an embodiment, the three inorganic structural sub-layers are an oil storage layer, a slow-release curing layer, and a dispersed surface layer; and the oil storage layer, the slow-release curing layer, and the dispersed surface layer are disposed sequentially in the direction away from the base layer.

In an embodiment, the oil storage layer, the slow-release curing layer, and the dispersed surface layer are stacked sequentially.

In an embodiment, the inorganic particles in the oil storage layer have a size of 15-60 μm; the oil storage layer has a thickness of 40-70 μm and a porosity of 15-25%; the inorganic particles in the slow-release curing layer have a size of 1-15 μm; the slow-release curing layer has a thickness of 20-40 μm and a porosity of 5-15%; the inorganic particles in the dispersed surface layer have a size of 100 nm to 1 μm; and the dispersed surface layer has a thickness of 1-20 μm.

In an embodiment, the oil storage layer includes ceramic particles with a weight ratio not less than 70%; the slow-release curing layer includes metal particles with a weight ratio not less than 60%; and the dispersed surface layer includes a carbon powder with a weight ratio not less than 50%.

Another aspect of the present disclosure provides a manufacturing method of the cooking utensil, including the following steps:
  forming the base layer from a metal base material by stretching or die casting, deburring, polishing, and cleaning, where the base layer has a thickness of not less than 1 mm; and
  coating the inorganic particles onto the inner surface of the base layer by cold spraying, plasma spraying, supersonic spraying, laser cladding, or air spraying to form the pure inorganic structural layer.

The present disclosure has the following beneficial effects. In the present disclosure, the pure inorganic structural layer of the cooking utensil includes at least three inorganic structural sub-layers. The at least three inorganic structural sub-layers are sequentially stacked on the inner surface of the base layer according to sizes of the inorganic particles. In the direction away from the base layer, the sizes of the inorganic particles in the multiple inorganic structural sub-layers decrease sequentially, and pore structures in the multiple inorganic structural sub-layers decrease sequentially in the direction away from the base layer. The pure inorganic structural layer features high bonding strength, high toughness, high surface hardness, and scratch and wear resistance. When the cooking utensil is hot and oily, its surface has the functions of oil absorption, oil storage, and self-lubrication. When the cooking utensil is heated, its surface pores can perform micro-pore heating and respiration, thereby achieving nonstick and easy cleaning effects.

BRIEF DESCRIPTION OF THE DRAWINGS

The FIGURE is a section drawing of a container wall of a cooking utensil with pure inorganic structural layer according to an embodiment of the present disclosure.

DETAILED DESCRIPTION OF THE EMBODIMENTS

In order to make the objectives, technical solutions, and advantages of the present disclosure clearer and more comprehensible, the present disclosure is described in more detail below with reference to the specific embodiments. Those skilled in the art should understand that the present disclosure is not limited to the drawings and the following embodiments.

As stated in the specification, the term "include" and its variants are open-ended terms, meaning "including but not limited to". The term "based on" and similar expressions can be understood as "at least based on". The terms such as "first," "second," and "third" are only intended to distinguish different features and have no substantive meaning. The terms "left", "right", "middle", and similar expressions are only intended to indicate the relative positional relationship between objects.

An embodiment of the present disclosure proposes a nonstick cooking utensil with a pure inorganic structural layer. The cooking utensil includes base layer 1 and pure inorganic structural layer 2. The pure inorganic structural layer 2 is formed by spraying inorganic particles on an inner surface of the base layer 1. The inorganic particles in the pure inorganic structural layer 2 form a connected pore structure. The inorganic particles sprayed on the inner surface of the base layer are pure inorganic particles, excluding organic solvents. The pure inorganic structural layer 2 includes at least three inorganic structural sub-layers. The at least three inorganic structural sub-layers are sequentially stacked on the inner surface of the base layer 1 according to sizes of the inorganic particles. The inorganic particles in the inorganic structural sub-layer adjacent to the base layer 1 have the largest size. In a direction away from the base layer 1, the sizes of the inorganic particles in the multiple inorganic structural sub-layers decrease sequentially, and pores in the multiple inorganic structural sub-layers decrease sequentially in the direction away from the base layer 1.

Specifically, the FIGURE is a section view of a container wall of the cooking utensil. According to the conditions and effects of use, the cooking utensil in the FIGURE is preferably a wok. The cooking utensil includes base layer 1 and pure inorganic structural layer 2.

The base layer 1 is the base of the cooking utensil, usually made of a metal material such as aluminum alloy, stainless steel, or iron, with a thickness of typically not less than 1 mm.

In the embodiment of the present disclosure, the pure inorganic structural layer 2 is formed by spraying 100 nm to 60 μm inorganic particles on the inner surface of the base layer 1. The spraying can be implemented by plasma spraying, supersonic spraying, cold spraying, laser cladding, air spraying, etc. The thickness of the pure inorganic structural layer 2 is 61-130 μm.

The inorganic particles may be metal particles or ceramic particles or carbon powder. The metal particles may be one or more of titanium, titanium alloy, zirconium, zirconium alloy, stainless steel, low-carbon steel, high-carbon steel, and zinc. The ceramic particles may be one or more of zirconium oxide, zirconium nitride, titanium oxide, titanium nitride, titanium carbide, aluminum oxide, magnesium oxide, triiron tetroxide, ferric oxide, boron nitride, calcium oxide, silicon oxide, and silicon nitride. The carbon powder may be one or more of natural graphite, polycrystalline graphite, pyrolytic graphite, highly oriented pyrolytic graphite, and carbon quantum dot. Due to the spraying process, the inorganic particles of the pure inorganic structural layer 2 do not adhere closely to each other but form a pore structure.

The pure inorganic structural layer 2 includes at least three inorganic structural sub-layers. The at least three inorganic structural sub-layers are sequentially stacked according to the sizes of the inorganic particles. The inorganic particles in the inorganic structural sub-layer adjacent to the base layer 1 have the largest size. In a direction away from the base layer 1, the sizes of the inorganic particles in the multiple inorganic structural sub-layers decrease sequentially.

In this embodiment, the three inorganic structural sub-layers are oil storage layer 21, slow-release curing layer 22, and dispersed surface layer 23 that are stacked sequentially. The inorganic particles in the oil storage layer 21 have a size of 15-60 μm, and can be one or more of the metal particles, the ceramic particles, or the carbon powders. The oil storage layer 21 has a thickness of 40-70 μm and a porosity of 15-25%. The inorganic particles in the slow-release curing layer 22 have a size of 1-15 μm, and can be one or more of the metal particles, the ceramic particles, or the carbon powders. The slow-release curing layer 22 has a thickness of 20-40 μm and a porosity of 5-15%. The inorganic particles in the dispersed surface layer 23 have a size of 100 nm to 1 μm, and can be one or more of the metal particles, the ceramic particles, or the carbon powders. The dispersed surface layer 23 has a thickness of 1-20 μm. In the present disclosure, the dispersed surface layer means that the inorganic particles do not completely cover the slow-release curing layer 22. For example, the inorganic particles are evenly distributed as individual particles on the slow-release curing layer 22. And/or, multiple surface layer sub-regions are uniformly distributed on the slow-release curing layer 22 to prevent the dispersed surface layer 23 from completely enclosing the slow-release curing layer 22, and a surface of the dispersed surface layer 23 is uneven and frosted.

Among the three inorganic structural sub-layers, namely the oil storage layer 21, the slow-release curing layer 22, and the dispersed surface layer 23, the inorganic particles in the oil storage layer 21 have the largest size, followed by the inorganic particles in the slow-release curing layer 22, and the inorganic particles in the dispersed surface layer 23 have the smallest size. Therefore, the pores formed between the inorganic particles in the oil storage layer 21 are the largest, followed by those formed between the inorganic particles in the oil storage layer 21, and those formed between the inorganic particles in the dispersed surface layer 23 are the smallest.

In this embodiment, the inorganic particles in the dispersed surface layer 23 have a size of 100 nm to 1 μm, which is much smaller than the size of the inorganic particles in the oil storage layer 21, which is 15-60 μm, as well as the size of the inorganic particles in the slow-release curing layer 22, which is 1-15 μm. Therefore, the pores in the oil storage layer 21 are relatively larger and are used to store oil. The pores in the dispersed surface layer 23 are smaller, relatively dense and uniform, improving the hardness of the dispersed surface layer 23 and facilitating the uniform permeation or separation of oil. The inorganic particles in the slow-release curing layer 22 between the oil storage layer 21 and the dispersed surface layer 23 have a medium size. The slow-release curing layer serves as a transition layer with a function of curing the coating, which can effectively bond the oil storage layer 21 and the dispersed surface layer 23, improving the bonding strength and toughness of the pure inorganic structural layer 2 and playing a role in assisting oil storage. In the beginning of heating the cooking utensil, as the temperature of the cooking utensil increases, a mixture of oil and gas first fills the slow-release curing layer 22 before it separates out from the dispersed surface layer 23. Therefore, the heating degree of the cooking utensil can be estimated based on the amount of oil separating out from the bottom of the cooking utensil.

Preferably, the oil storage layer 21 mainly includes ceramic particles with a weight ratio not less than 70%. The slow-release curing layer 22 mainly includes metal particles with a weight ratio not less than 60%. The dispersed surface layer 23 mainly includes a carbon powder with a weight ratio not less than 50%. Therefore, the oil storage layer forms a bottom layer, mainly including ceramic particles. The ceramic layer provides a porous layer with a stable structure, high strength, and high hardness. The slow-release layer forms a second layer, mainly including a composite metal layer of metal particles. The second layer improves the toughness of the bottom ceramic layer, optimizes the pore structure, increases the pore density, reduces the pore size, improves the stability of oil storage, and provides a strong metallic texture on the surface. The surface layer forms a third layer, mainly including carbon powder or other similar material. The third layer has a self-lubricating function, reducing the surface friction coefficient of the dispersed surface layer 23 and reducing the dynamic friction coefficient under oil conditions. Therefore, the surface of the pure inorganic structural layer 2 is easy to clean and has physical nonstick properties.

Through material stacking, the pure inorganic structural layer 2 forms a three-dimensional structure with pores that can store oil. The surface of the pure inorganic structural layer 2 forms an uneven structure, which can partially suspend the food. In the food and the surface pores, the heated oil slightly boils and generates a large amount of hot steam, further supporting the food, separating it from the surface, and achieving a certain physical nonstick effect.

The present disclosure is described below with the example of a nonstick pan.

During cooking, the nonstick pan is heated. The pores/micro-pores in the pure inorganic structural layer 2 expand upon heating, with strong adsorption of oil. After oil is added into the nonstick pan, the oil fully wets and fills the micro-pores. Then as the nonstick pan is continuously heated, the oil in the pores slightly boils and generates hot stream. The slightly boiling oil and hot stream are located between the food and the pure inorganic structural layer 2 to support the food, thereby separating the food from the pure inorganic structural layer 2. When the cooking is finished, the food carries away the oil, and the temperature of the nonstick pan decreases. The temperature of the oil in the pores of the pure inorganic structural layer 2 decreases, making the pores shrink in volume, thereby leaving a residue of oil. The design achieves a surface cleaning effect on the nonstick pan. In the pores of the nonstick coating 2, especially in the pores of the oil storage layer 21, a certain amount of oil is retained. When the nonstick pan is heated again, the oil in the pores separates out, maintaining a moist state at the bottom of the pan. Therefore, the working principle of the nonstick pan in this embodiment is as follows. When the nonstick pan is continuously heated, the oil in the pores of the pure inorganic structural layer 2 continues to maintain a boiling state and generates a large amount of hot stream to suspend (semi-float) the food at the bottom of the nonstick pan, thereby achieving a nonstick effect. It should be noted that after the cooking is finished, the nonstick pan in this embodiment can be cleaned with hot water to replace the oil retained in the micro-pores, thereby thoroughly cleaning the nonstick pan.

This embodiment only shows three sequentially stacked inorganic structural sub-layers. Those skilled in the art can understand that one or more slow-release curing layers with a different size in the inorganic particles can be further provided between the oil storage layer 21 and the dispersed surface layer 23 to further improve the bonding strength and toughness of the pure inorganic structural layer 2. However, such a solution should also fall within the protection scope of the present disclosure.

Another embodiment of the utility model provides a manufacturing method of the cooking utensil, which includes the following steps.

S1. The base layer is formed.

The base layer 1 is formed from a metal base material such as aluminum alloy, stainless steel, or iron by stretching or die casting, deburring, polishing, and cleaning, where the base layer has a thickness of not less than 1 mm.

S2. The pure inorganic structural layer 2 is formed on the base layer 1 by spraying.

The inorganic particles are coated onto the inner surface of the base layer 1 by cold spraying, plasma spraying, supersonic spraying, laser cladding, or air spraying to form the pure inorganic structural layer 2. It should be noted that laser cladding is a type of thermal spraying.

In a preferred embodiment of the present disclosure, the base material is preheated to 80-120° C., and the inorganic particles mainly including ceramic particles (not less than 70% by weight) are sprayed onto the inner surface of the base layer 1 through plasma spraying or supersonic spraying to form the oil storage layer 21. Preferably, taking plasma spraying as an example, the amount of the inorganic particles is adjusted to 4-8 mg/s at 55-65 V and 500-600 A. The inorganic particles are sprayed onto the inner surface of the base layer 1 with a hydrogen gas at a flow rate of 4-8 L/m, with a spray distance of 10-15 mm, to form the oil storage layer 21 with a coating thickness of 40-70 µm and a porosity of 15-25%. For a 30 cm wok, the spraying is performed for 50-90 s. The basic coating ensures the hardness and strength of the pure inorganic structural layer 2, and builds a basic pore layer with a thickness of 40-70 µm.

The inorganic particles mainly including metal particles (not less than 60% by weight) are sprayed onto an outer surface of the oil storage layer 21 through cold spraying and supersonic spraying to form the slow-release curing layer 22. Preferably, taking cold spraying as an example, a nitrogen gas at 200-400° ° C. is used as the spraying gas, with a spray pressure of 2.0-3.5 MPa and a flow rate of 500-900 m/s. The metal particle powder is fed into the gas along an axial direction of the spraying gas to form a gas-solid flow. The spraying is performed at a distance of 10-25 mm from the outer surface of the oil storage layer 21 to form the slow-release curing layer 22 with a thickness of 2-40 µm and a porosity of 5-15%. For a 30 cm wok, the spraying is performed for 30-60 s. During the spraying process, the oil storage layer 21 can be appropriately subjected to filling, secondary stacking, and surface modification to form finer micro-nano-sized pores.

Finally, the inorganic particles mainly including carbon powder (not less than 50% by weight) are sprayed onto an outer surface of the slow-release curing layer 22 through laser cladding or spraying to form the dispersed surface layer 23. Preferably, taking the spraying process as an example, at a pressure of 0.4-0.6 MPa, a carbon powder resin is sprayed at a distance of 10-25 mm from the outer surface of the slow-release curing layer 22. Sintering and curing are performed at 330° ° C. for 8-12 min. In this way, the dispersed surface layer 23 with a self-lubricating function and a thickness of 1-20 µm is formed on the surface of the slow-release curing layer 22. The surface of the dispersed surface layer 23 is uneven and frosted.

The nonstick pan according to an embodiment of the present disclosure is manufactured by the above manufacturing method. The nonstick pan includes a base layer made of stainless steel and having a thickness of 1.2 mm. The nonstick pan further includes a pure inorganic structural layer, which includes three inorganic structural sub-layers, namely oil storage layer 21, slow-release curing layer 22, and dispersed surface layer 23. The oil storage layer 21 includes 72% by weight of ceramic particles (inorganic particles with a size of 35 µm), with a thickness of 60 µm and a porosity of 20%. The slow-release curing layer 22 includes 64% by weight of metal particles (inorganic particles with a size of 10 µm), with a thickness of 30 µm and a porosity of 15%. The dispersed surface layer 23 includes 50% by weight of carbon powder (inorganic particles with a size of 300 nm), with a thickness of 5 µm.

The physical indicators were detected as follows.

1. Hardness. The pencil hardness reached above 9H, and the steak knife did not cause any scratch when it was passed over the nonstick pan, nor did the shovel and steel wool.

2. High-temperature resistance. After being heated continuously in a 500° C. oven for 1 h, the nonstick pan did not crack, discolor, or lose weight.

3. Thermal shock. The workpiece was heated to 400° C. and then immersed in 20° C. of water for 50 consecutive shocks, and the nonstick pan did not crack or discolor.

4. Nonstick test.

(1). Eggs Frying

The nonstick pan was treated according to a standard method before cooking for the first time. Then the nonstick pan is heated up to 150° C., and 5 g of oil was sprayed three times with an oil sprayer. When the nonstick pan was heated up to 160° C., egg was put into the nonstick pan. When the nonstick pan was observed nonstick, the spraying of oil was stopped, and the frying was continued. Under the condition of no oil and continuous heating, the product could continuously fry 6 eggs without sticking.

(2). Pork Shreds Frying (Two Methods)

Hot pan and cold oil method. When the nonstick pan was heated up to 200° C., oil was sprayed into the nonstick pan, and immediately marinated pork shreds were added into the nonstick pan and stir-fried. It was observed that the nonstick pan was not sticky.

Hot pan and hot oil method. When the nonstick pan was heated up to 200° C., oil was sprayed into the nonstick pan. When the oil smoked slightly, marinated pork shreds were added into the nonstick pan and stir-fried. It was observed that the nonstick pan was not sticky.

In this specification, descriptions of reference terms such as "one embodiment", "some embodiments", "an example", "a specific example", and "some examples" indicate that specific features, structures, materials, or characteristics described in combination with the embodiment(s) or example(s) are included in at least one embodiment or example of the present disclosure. In this specification, the schematic representations of the above terms do not necessarily refer to the same embodiment or example. In addition, the specific features, structures, materials, or characteristics described may be combined in any suitable manner in any one or more embodiments or examples.

The foregoing illustrates the implementation of the present disclosure. However, the present disclosure is not limited to the aforementioned implementation. Any modifications, equivalent substitutions, improvements, etc. made within the spirit and scope of the present disclosure should be included within the protection scope of the present disclosure.

What is claimed is:

1. A nonstick cooking utensil with a pure inorganic structural layer, comprising a base layer and a pure inorganic structural layer, wherein the pure inorganic structural layer is formed by spraying inorganic particles on an inner surface of the base layer; and the inorganic particles in the pure inorganic structural layer form a connected pore structure; and the pure inorganic structural layer comprises at least three inorganic structural sub-layers; the at least three inorganic structural sub-layers are sequentially stacked on the inner surface of the base layer according to sizes of the inorganic particles; the inorganic particles in the inorganic structural sub-layer adjacent to the base layer have a largest size; and in a direction away from the base layer, the sizes of the inorganic particles in the at least three inorganic structural sub-layers decrease sequentially, and pores in the at least three inorganic structural sub-layers decrease sequentially in the direction away from the base layer;

wherein the at least three inorganic structural sub-layers are an oil storage layer, a slow-release curing layer, and a dispersed surface layer; and the oil storage layer, the slow-release curing layer, and the dispersed surface layer are disposed sequentially in the direction away from the base layer.

2. The cooking utensil according to claim 1, wherein the inorganic particles have a size of 100 nm to 60 μm, and are coated onto the inner surface of the base layer by plasma spraying, supersonic spraying, cold spraying, laser cladding, or air spraying; and the pure inorganic structural layer has a thickness of 61-130 μm.

3. The cooking utensil according to claim 1, wherein the inorganic particles are metal particles or ceramic particles or carbon powder;

the metal particles are one or more of titanium, titanium alloy, zirconium, zirconium alloy, stainless steel, low-carbon steel, high-carbon steel, and zinc;

the ceramic particles are one or more of zirconium oxide, zirconium nitride, titanium oxide, titanium nitride, titanium carbide, aluminum oxide, magnesium oxide, triiron tetroxide, ferric oxide, boron nitride, calcium oxide, silicon oxide, and silicon nitride; and the carbon powder is one or more of natural graphite, polycrystalline graphite, pyrolytic graphite, highly oriented pyrolytic graphite, and carbon quantum dot.

4. The cooking utensil according to claim 1, wherein the oil storage layer, the slow-release curing layer, and the dispersed surface layer are stacked sequentially.

5. The cooking utensil according to claim 4, wherein the inorganic particles in the oil storage layer have a size of 15-60 μm; the oil storage layer has a thickness of 40-70 μm and a porosity of 15-25%; the inorganic particles in the slow-release curing layer have a size of 1-15 μm; the slow-release curing layer has a thickness of 20-40 μm and a porosity of 5-15%; the inorganic particles in the dispersed surface layer have a size of 100 nm to 1 μm; and the dispersed surface layer has a thickness of 1-20 μm.

6. The cooking utensil according to claim 4, wherein the oil storage layer comprises ceramic particles with a weight ratio not less than 70%; the slow-release curing layer comprises metal particles with a weight ratio not less than 60%; and the dispersed surface layer comprises a carbon powder with a weight ratio not less than 50%.

7. A manufacturing method of the cooking utensil according to claim 1, comprising the following steps:

forming the base layer from a metal base material by stretching or die casting, deburring, polishing, and cleaning, wherein the base layer has a thickness of not less than 1 mm; and coating the inorganic particles onto the inner surface of the base layer by cold spraying, plasma spraying, supersonic spraying, laser cladding, or air spraying to form the pure inorganic structural layer.

8. A manufacturing method of the cooking utensil according to claim 2, comprising the following steps:

forming the base layer from a metal base material by stretching or die casting, deburring, polishing, and cleaning, wherein the base layer has a thickness of not less than 1 mm; and coating the inorganic particles onto the inner surface of the base layer by cold spraying, plasma spraying, supersonic spraying, laser cladding, or air spraying to form the pure inorganic structural layer.

9. A manufacturing method of the cooking utensil according to claim 3, comprising the following steps:

forming the base layer from a metal base material by stretching or die casting, deburring, polishing, and cleaning, wherein the base layer has a thickness of not less than 1 mm; and coating the inorganic particles onto the inner surface of the base layer by cold spraying, plasma spraying, supersonic spraying, laser cladding, or air spraying to form the pure inorganic structural layer.

10. A manufacturing method of the cooking utensil according to claim 4, comprising the following steps:

forming the base layer from a metal base material by stretching or die casting, deburring, polishing, and cleaning, wherein the base layer has a thickness of not less than 1 mm; and coating the inorganic particles onto the inner surface of the base layer by cold spraying, plasma spraying, supersonic spraying, laser cladding, or air spraying to form the pure inorganic structural layer.

11. A manufacturing method of the cooking utensil according to claim 5, comprising the following steps:

forming the base layer from a metal base material by stretching or die casting, deburring, polishing, and cleaning, wherein the base layer has a thickness of not less than 1 mm; and coating the inorganic particles onto the inner surface of the base layer by cold spraying, plasma spraying, supersonic spraying, laser cladding, or air spraying to form the pure inorganic structural layer.

12. A manufacturing method of the cooking utensil according to claim 6, comprising the following steps:

forming the base layer from a metal base material by stretching or die casting, deburring, polishing, and cleaning, wherein the base layer has a thickness of not less than 1 mm; and coating the inorganic particles onto the inner surface of the base layer by cold spraying, plasma spraying, supersonic spraying, laser cladding, or air spraying to form the pure inorganic structural layer.

\* \* \* \* \*